United States Patent
Matsunobu et al.

(10) Patent No.: US 10,789,765 B2
(45) Date of Patent: Sep. 29, 2020

(54) THREE-DIMENSIONAL RECONSTRUCTION METHOD

(71) Applicant: Panasonic Intellectual Property Management Co., Ltd., Osaka (JP)

(72) Inventors: Toru Matsunobu, Osaka (JP); Toshiyasu Sugio, Osaka (JP); Satoshi Yoshikawa, Hyogo (JP); Tatsuya Koyama, Kyoto (JP); Pongsak Lasang, Singapore (SG); Jian Gao, Singapore (SG)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/163,010

(22) Filed: Oct. 17, 2018

(65) Prior Publication Data

US 2019/0051036 A1 Feb. 14, 2019

Related U.S. Application Data

(63) Continuation of application No. PCT/JP2017/014330, filed on Apr. 6, 2017.

(30) Foreign Application Priority Data

Apr. 22, 2016 (JP) .................... 2016-086595

(51) Int. Cl.
*G06T 17/00* (2006.01)
*G06T 15/20* (2011.01)
(Continued)

(52) U.S. Cl.
CPC .......... *G06T 15/205* (2013.01); *G06K 9/6267* (2013.01); *G06T 1/00* (2013.01);
(Continued)

(58) Field of Classification Search
None
See application file for complete search history.

(56) References Cited

U.S. PATENT DOCUMENTS 9,648,303 B1 * 5/2017 Resch .................. G06T 7/246
10,096,114 B1 * 10/2018 Lasenby .............. H04N 17/002
(Continued)

FOREIGN PATENT DOCUMENTS

JP  2006-170993  6/2006
JP  2009-237845  10/2009
(Continued)

OTHER PUBLICATIONS

International Search Report (ISR) dated Jul. 4, 2017 in International (PCT) Application No. PCT/JP2017/014330.

*Primary Examiner* — Andrew G Yang
(74) *Attorney, Agent, or Firm* — Wenderoth, Lind & Ponack, L.L.P.

(57) ABSTRACT

Provided is a three-dimensional reconstruction method of reconstructing a three-dimensional model from multi-view images. The method includes: selecting two frames from the multi-view images; calculating image information of each of the two frames; selecting a method of calculating corresponding keypoints in the two frames, according to the image information; and calculating the corresponding keypoints using the method of calculating corresponding keypoints selected in the selecting of the method of calculating corresponding keypoints.

12 Claims, 9 Drawing Sheets

(51) Int. Cl.
- *G06T 7/55* (2017.01)
- *G06T 1/00* (2006.01)
- *H04N 7/18* (2006.01)
- *G06T 7/292* (2017.01)
- *G06K 9/62* (2006.01)

(52) U.S. Cl.
CPC ............... *G06T 7/292* (2017.01); *G06T 7/55* (2017.01); *G06T 17/00* (2013.01); *H04N 7/18* (2013.01); *G06T 2200/08* (2013.01); *G06T 2207/10016* (2013.01); *G06T 2207/20021* (2013.01); *G06T 2207/20088* (2013.01); *G06T 2207/30228* (2013.01)

(56) References Cited

U.S. PATENT DOCUMENTS

| | | | |
|---|---|---|---|
| 10,192,287 B2* | 1/2019 | Chan | G06K 9/00523 |
| 2006/0125920 A1 | 6/2006 | Criminisi et al. | |
| 2012/0194513 A1 | 8/2012 | Sakurai et al. | |
| 2013/0278728 A1* | 10/2013 | Gong | H04N 5/247 348/47 |
| 2014/0037212 A1* | 2/2014 | Endo | G06T 7/246 382/195 |
| 2014/0049566 A1* | 2/2014 | Sudou | G09G 5/38 345/681 |
| 2014/0294361 A1* | 10/2014 | Acharya | G11B 27/10 386/241 |
| 2016/0098858 A1* | 4/2016 | Patkar | G06T 7/73 345/420 |
| 2016/0188994 A1* | 6/2016 | Wu | G06T 7/593 382/195 |
| 2016/0350904 A1* | 12/2016 | Zhang | G06T 17/00 |
| 2017/0193693 A1* | 7/2017 | Robert | G06T 7/55 |
| 2018/0211399 A1* | 7/2018 | Lee | G06T 7/579 |

FOREIGN PATENT DOCUMENTS

| | | |
|---|---|---|
| JP | 2010-250452 | 11/2010 |
| JP | 2012-160937 | 8/2012 |

\* cited by examiner

FIG. 2
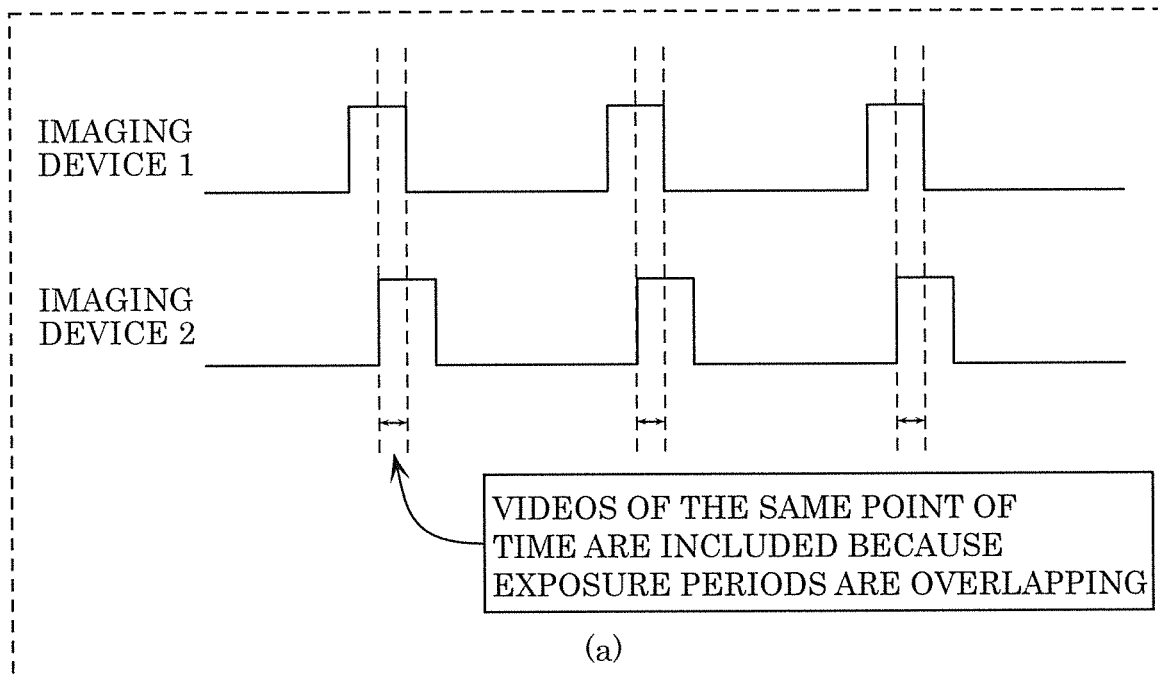
(a)
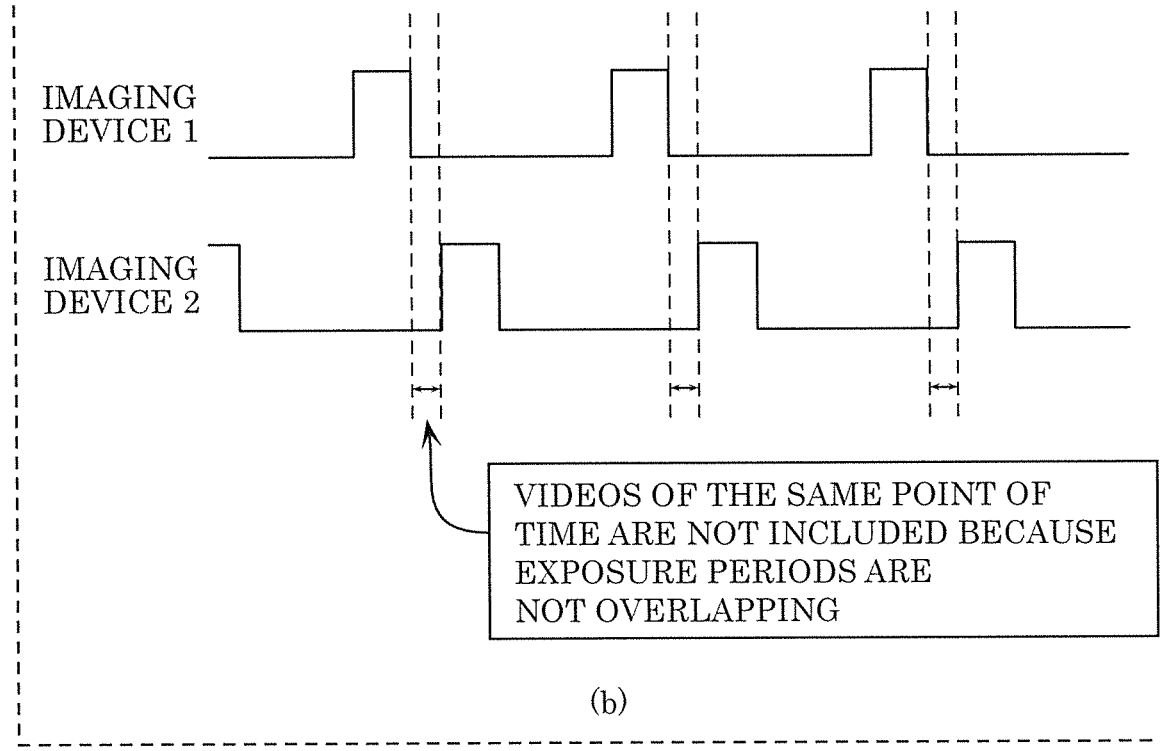
(b)

THREE-DIMENSIONAL RECONSTRUCTION METHOD

CROSS REFERENCE TO RELATED APPLICATIONS

This application is a U.S. continuation application of PCT International Patent Application Number PCT/JP2017/014330 filed on Apr. 6, 2017, claiming the benefit of priority of Japanese Patent Application Number 2016-086595 filed on Apr. 22, 2016, the entire contents of which are hereby incorporated by reference.

BACKGROUND

1. Technical Field

The present disclosure relates to a three-dimensional reconstruction method, and in particular to a three-dimensional reconstruction method for reconstructing a three-dimensional model of a subject using a plurality of moving images captured by a plurality of imaging devices.

2. Description of the Related Art

The three-dimensional reconstruction technique in the field of computer vision makes correspondence between a plurality of two-dimensional images to estimate the position and orientation of cameras and a three-dimensional position of the subject.

For example, according to Japanese Unexamined Patent Application Publication No. 2009-237845, keypoints are extracted from several initial frames of a moving image input from a monocular camera and correspondence is made between keypoint positions by frame matching. In subsequent frames, keypoint position information is obtained by time-series keypoint tracking using an extended Kalman filter. A three-dimensional model is reconstructed based on Structure from Motion (SfM) using corresponding keypoints.

In addition, in Japanese Unexamined Patent Application Publication No. 2012-160937, a three-dimensional model is reconstructed by performing keypoint matching on key frames obtained at a predetermined cycle from two moving images synchronously captured by a stereo camera. Moreover, a three-dimensional model can be reconstructed also for frames between the key frames using a change in a keypoint in the temporal direction.

Furthermore, in Japanese Unexamined Patent Application Publication No. 2010-250452, calibration is performed among three or more cameras, and each camera coordinate system is converted into a virtual camera coordinate system of an arbitrary viewpoint according to camera parameters obtained. In the virtual camera coordinate system, distance information is estimated by making correspondence through block matching between images after the coordinate conversion. An image of a virtual camera viewpoint is synthesized based on the distance information estimated.

SUMMARY

However, with the above-described conventional techniques, it is difficult to appropriately reconstruct, regardless of the motion of the subject, time-series three-dimensional models from moving images captured, using a plurality of fixed or non-fixed cameras or both fixed and non-fixed cameras.

That is to say, when the subject is moving in the image capturing environment, making correspondence between two-dimensional images is difficult with time-series images captured by the monocular camera as disclosed in Japanese Unexamined Patent Application Publication No. 2009-237845. In addition, since Japanese Unexamined Patent Application Publication No. 2010-250452 performs synchronous capturing at the time of calibration, it is difficult, as in Japanese Unexamined Patent Application Publication No. 2009-237845, to precisely estimate three-dimensional positions of a moving subject. Furthermore, since Japanese Unexamined Patent Application Publication No. 2012-160937 uses a stereo camera having two cameras with a fixed positional relationship, the camera positions are restricted.

In order to solve the problems described above, a three-dimensional reconstruction method according to an aspect of the present disclosure is a three-dimensional reconstruction method of reconstructing a three-dimensional model from multi-view images. The three-dimensional reconstruction method includes: selecting two frames from the multi-view images; calculating image information of each of the two frames; selecting a method of calculating corresponding keypoints in the two frames, according to the image information; and calculating the corresponding keypoints using the method of calculating corresponding keypoints selected in the selecting of the method of calculating corresponding keypoints.

With the three-dimensional reconstruction method according to the present disclosure, it is possible to appropriately reconstruct, regardless of the motion of the subject, time-series three-dimensional models from moving images captured, using a plurality of fixed or non-fixed cameras or both fixed and non-fixed cameras.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 illustrates an example of videos obtained by synchronous capturing and videos obtained by asynchronous capturing;

DETAILED DESCRIPTION OF EMBODIMENT

First, three-dimensional reconstruction according to the present disclosure will be defined. Videos obtained by capturing a subject in the real space using a plurality of cameras with different viewpoints are referred to as multi-view videos, and reconstruction of the subject in a three-dimensional space using the multi-view two-dimensional images is referred to as three-dimensional reconstruction. The subject reconstructed in a three-dimensional space is referred to as a three-dimensional model. At this time, the parameter of each camera may be obtained in advance or may be estimated at the same time as when the three-dimensional model is created. In the present embodiment, the camera parameter is estimated at the same time as when the three-dimensional model is created.

Note that camera parameters include at least one of internal parameters such as the focal length of the camera, the distortion coefficient of the lens, and the image center, and external parameters such as the three-dimensional position and orientation of the camera.

Note that the three-dimensional model of the subject includes the respective three-dimensional positions of a plurality of points on the subject in multi-view two-dimensional images. The three-dimensional positions are each represented by three-value information including the X component, the Y component, and the Z component of a three-dimensional coordinate space defined by the X, Y, and Z axes, for example. Note that the three-dimensional model may include information representing the hue of each point and the surface shape of each point and its surroundings in addition to the three-dimensional positions.

Next, synchronous capturing according to the present disclosure will be defined. Examples of capturing cycles and exposure periods of cameras are illustrated in FIG. 2. In FIG. 2, the horizontal axis represents time, and a time period for which a rectangular signal is high represents a time period during which the camera is exposed. When obtaining an image using a camera, the time period during which the shutter is released is referred to as an exposure period. A scene exposed to the image sensor through a lens during the exposure period is obtained as an image. In (a) in FIG. 2, frames captured by two cameras having different views have exposure periods that are overlapping each other. Therefore, the frames obtained by the two cameras are synchronous frames, which include a scene of the same point of time. In contrast, in (b) in FIG. 2, since the exposure periods of frames obtained by the two cameras are not overlapping each other, the frames obtained by the two cameras are asynchronous frames, which do not include a scene of the same point of time. Capturing synchronous frames with a plurality of cameras as in (a) in FIG. 2 is referred to as synchronous capturing.

Figure 1:
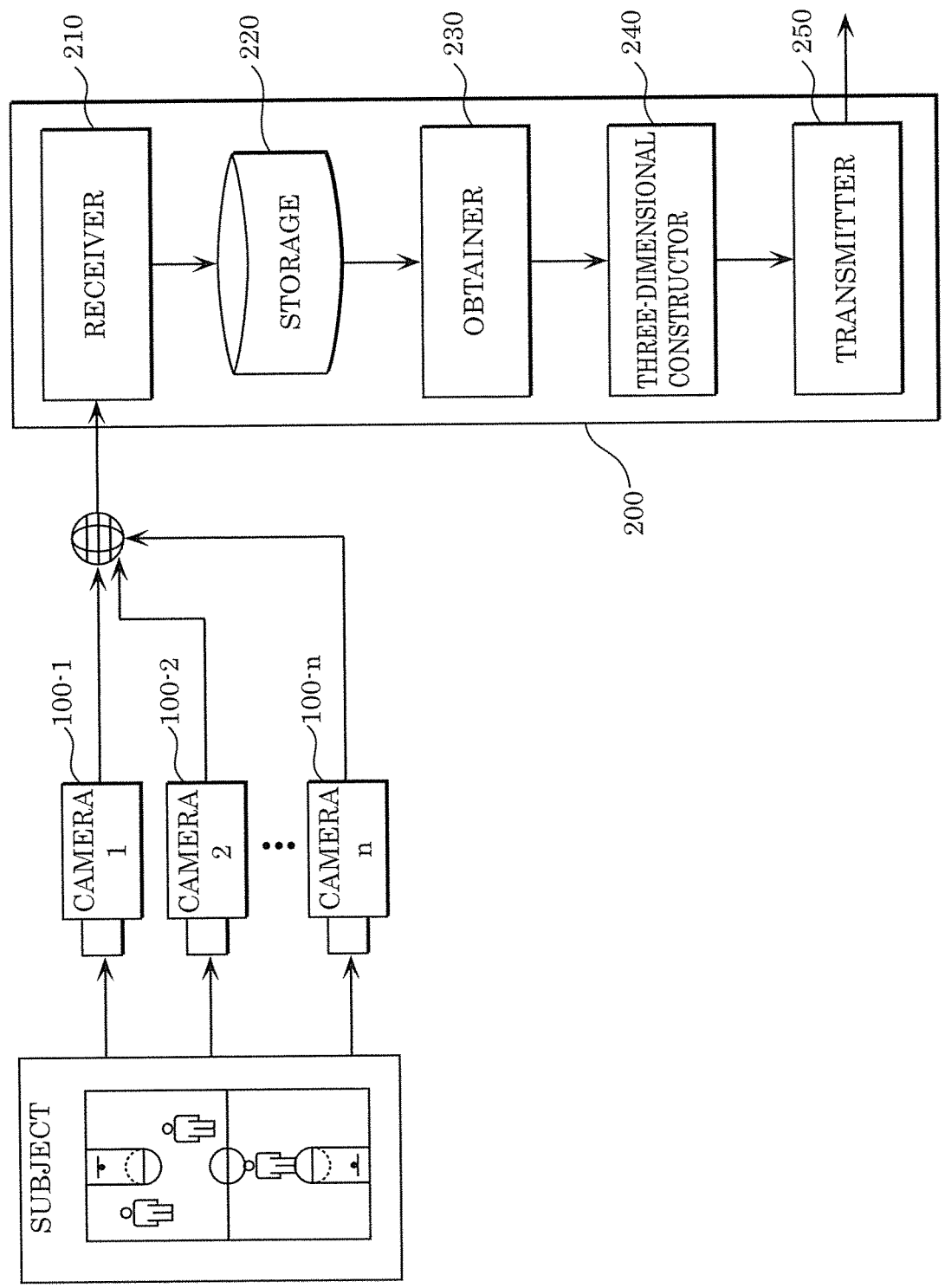
FIG. 1 illustrates an overall configuration of a three-dimensional reconstruction system according to the present disclosure.

Next, the overall configuration of a three-dimensional reconstruction system according to the present embodiment will be described. FIG. 1 illustrates a configuration of the three-dimensional reconstruction system according to the present embodiment.

The three-dimensional reconstruction system according to the present embodiment includes a subject, cameras, and three-dimensional reconstruction device 200 that receives multi-view images and performs image processing. The subject is, for example, a scene of a basketball game. N cameras 100-1 to 100-*n* capture videos of the subject at different viewpoints and transmit the captured multi-view videos to three-dimensional reconstruction device 200.

Note that the multi-view videos captured by plural cameras 100-1 to 100-*n* may be transmitted to three-dimensional reconstruction device 200 via either a public communication network such as the Internet or a dedicated communication network. Alternatively, the multi-view videos may be temporarily stored directly from the cameras in an external storage device such as a hard disk drive (HDD) or a solid-state drive (SSD) and directly input to three-dimensional reconstruction device 200 when necessary. Alternatively, the multi-view videos may be temporarily transmitted to and stored in an external storage device such as a cloud server via a network, and transmitted to three-dimensional reconstruction device 200 when necessary.

Note that camera specifying information such as a camera ID specifying a camera that has performed image capturing may be added to the multi-view videos as the header information of videos or frames.

Note that synchronous capturing, that is to capture a subject at the same point of time in each frame using a plurality of cameras, may be performed. Alternatively, the built-in clocks of a plurality of cameras may be synchronized, and the capturing time information may be added to each video or frame without performing synchronous capturing, or an index number indicating the number in the capturing order, which is an order in which frames are captured, may be added.

Note that information indicating whether synchronous capturing has been performed or asynchronous capturing has been performed may be added, as header information, to the video set, each image, or each frame of the multi-view videos.

Three-dimensional reconstruction device 200 includes receiver 210, storage 220, obtainer 230, three-dimensional reconstructor 240, and transmitter 250.

Receiver 210 receives multi-view videos captured by the plurality of cameras via a network or directly from the external storage device, and inputs the multi-view videos to storage 220.

Storage 220 stores the multi-view videos received by receiver 210.

Obtainer 230 obtains the multi-view videos from storage 220, divides the videos into frames, and inputs a multi-view frame set including a plurality of frames to three-dimensional reconstructor 240.

Note that the multi-view frame set may include: a plurality of frames obtained by selecting one frame from each of all the videos; a plurality of frames obtained by selecting at least one frame from all the videos; a plurality of frames obtained by selecting one frame from each of two or more videos selected from among the multi-view videos; or a plurality of frames obtained by selecting at least one frame from each of two or more videos selected from among the multi-view videos.

Note that when the camera specifying information is not added to each frame of the multi-view frame set, it may be individually added to the header information of each frame, or may be collectively added to the header information of the multi-view frame set.

When the index number indicating the capturing time or capturing order is not added to each frame of the multi-view frame set, it may be individually added to the header information of each frame, or may be collectively added to the header information of the frame set.

Using the multi-view frame set input from obtainer 230, three-dimensional reconstructor 240 estimates camera parameters of cameras that have captured the frames included in the multi-view frame set, and reconstructs a three-dimensional model of the subject included in each frame.

Transmitter 250 transmits the camera parameters or the three-dimensional model, or both, calculated by three-dimensional reconstructor 240 to, for example, a storage device or a processing device outside three-dimensional reconstruction device 200.

Figure 3:
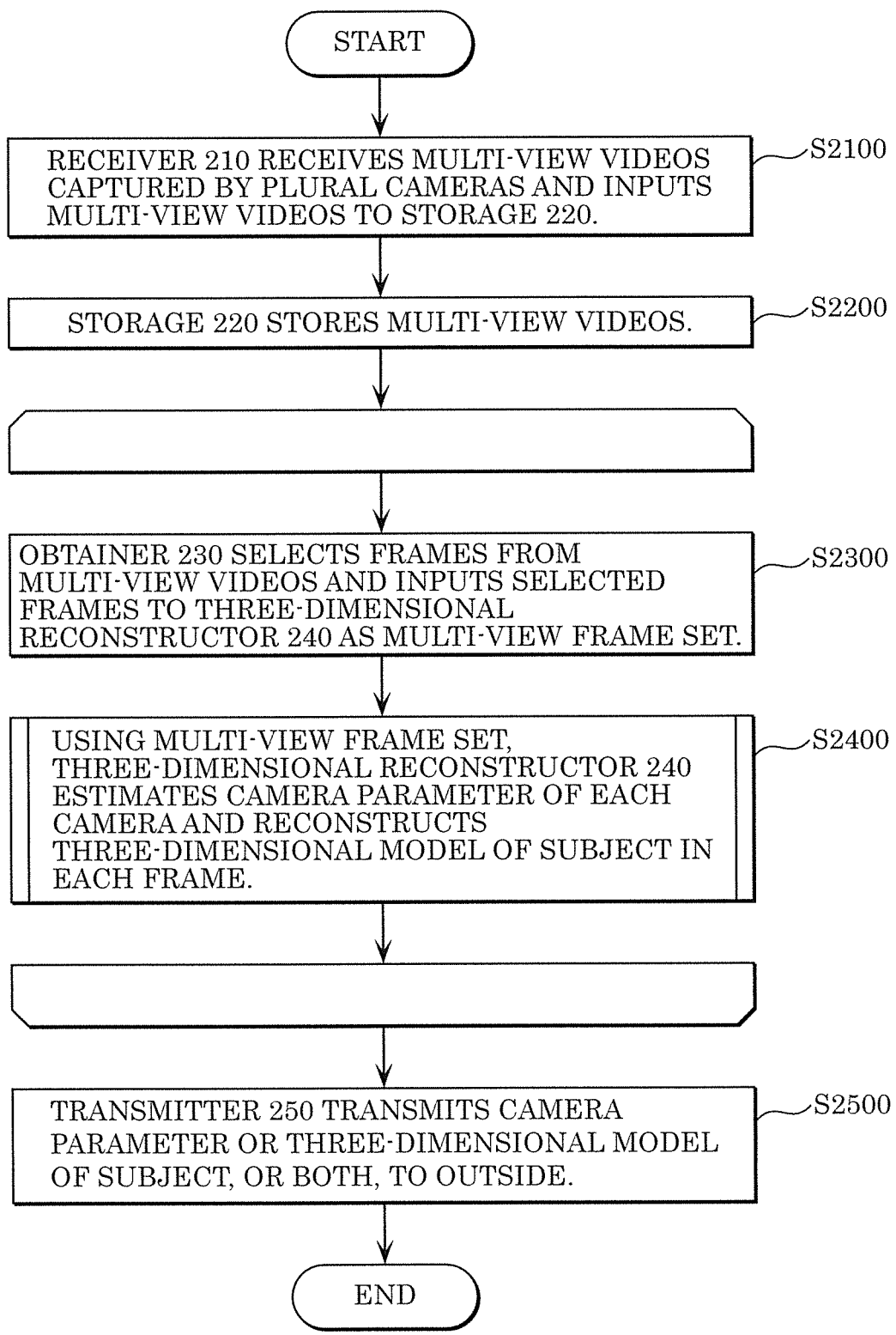
FIG. 3 illustrates a processing flow of a three-dimensional reconstruction device according to the present disclosure.

FIG. 3 is a processing flow of three-dimensional reconstruction device 200 of the three-dimensional reconstruction system according to the present embodiment.

First, receiver 210 receives multi-view videos captured by a plurality of cameras, and inputs the multi-view videos to storage 220 (S2100).

Next, storage 220 stores the multi-view videos (S2200).

Next, obtainer 230 obtains the multi-view videos from storage 220, divides the videos into frames, creates a multi-view frame set including a plurality of frames, and inputs the multi-view frame set to three-dimensional reconstructor 240 (S2300).

Note that obtainer 230 may immediately obtain the multi-view videos from receiver 210, rather than from storage 220.

Next, using the multi-view frame set, three-dimensional reconstructor 240 estimates camera parameters of cameras that have captured the frames, and reconstructs a three-dimensional model of the subject included in each frame (S2400).

S2300 and S2400 are repeated until there is no more multi-view frame set created by obtainer 230 or until a user instructs to stop.

Next, transmitter 250 transmits the camera parameters, the three-dimensional model of the subject, or both, to the outside (S2500).

Hereinafter, an embodiment will be described in detail with accompanying drawings. Note that the embodiment described below illustrates a general or specific example. The numerical values, shapes, materials, structural elements, the arrangement and connection of the structural elements, etc., illustrated in the embodiment below are mere examples, and are not intended to limit the present disclosure. Furthermore, among the structural elements in the embodiment below, structural elements not recited in any one of the independent claims representing the most generic concepts will be described as optional structural elements.

Embodiment 1

Figure 4:
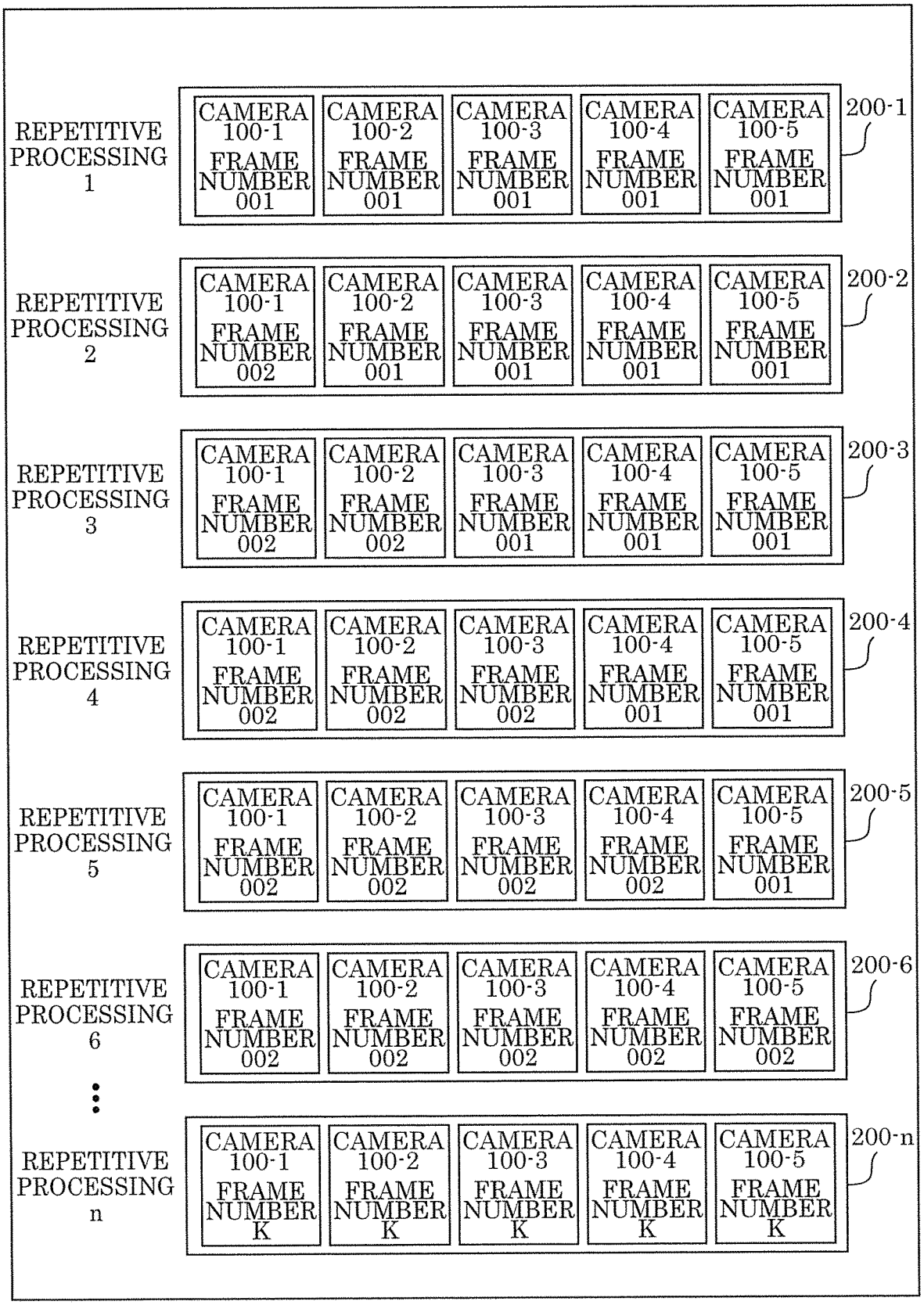
FIG. 4 illustrates an example of multi-view frame sets to be input to a three-dimensional reconstructor according to the present disclosure.

First, in the present embodiment, a multi-view frame set to be input to three-dimensional reconstructor 240 will be described. FIG. 4 illustrates an example in which one frame is selected from each of five multi-view cameras to constitute a frame set.

Here, it is assumed that the multi-view cameras perform synchronous capturing, and a camera ID (100-1 to 100-5) is added to the header information of each frame to identify the camera that has captured the frame. Frame numbers 001 to N indicating the numbers in a capturing order in which frames are captured by a camera are also added, and when frames have the same frame number among different cameras, it means that such frames were captured to shoot the target at the same point of time.

Obtainer 230 sequentially inputs frame sets 200-1 to 200-$n$ to three-dimensional reconstructor 240, and three-dimensional reconstructor 240 sequentially performs three-dimensional reconstruction by repetitive processing, using frame sets 200-1 to 200-$n$.

Frame set 200-1 includes five frames: a frame having frame number 001 of camera 100-1, a frame having frame number 001 of camera 100-2, a frame having frame number 001 of camera 100-3, a frame having frame number 001 of camera 100-4, and a frame having frame number 001 of camera 100-5. By using frame set 200-1 as the initial group of frames of the multi-view videos in repetitive processing 1 of three-dimensional reconstructor 240, it is possible to three-dimensionally reconstruct the initial state of the image capturing environment. Frame set 200-2 is a frame set in which the frame of camera 100-1 in frame set 200-1 is updated to a frame having frame number 002, which has been captured at the next point of time. By using frame set 200-2 in repetitive processing 2, a three-dimensional model which includes both the time at which the frames having frame number 001 have been captured and the time at which the frame having frame number 002 has been captured is reconstructed. Thereafter, a frame of one camera is updated in each of repetitive processing 3 to 5 in the same manner. Then, in frame set 200-6, the frames of all the cameras in frame set 200-1 are updated to frames captured at the next point of time. That is to say, in order to reconstruct a three-dimensional model that is ahead by one point of time, three-dimensional reconstruction unit 240 performs the repetitive processing five times. By sequentially updating the frame numbers in the frame set in such a manner as described, it is possible to reconstruct time-series three-dimensional models that are different in point of time but have the same coordinate axes.

Note that, even without synchronous capturing, obtainer 230 can create a frame set, using the multi-view videos obtained. In that case, the capturing time is given to each frame, and obtainer 230 creates frame sets combining synchronous frames and asynchronous frames based on the capturing times. The following describes a method of determining synchronous frames and asynchronous frames using capturing times of two cameras.

Assume that the capturing time of a frame selected from among the frames captured by camera 100-1 is $T_1$, the capturing time of a frame selected from among the frames captured by camera 100-2 is $T_2$, the exposure period of camera 100-1 is $T_{E1}$, and the exposure period of camera 100-2 is $T_{E2}$. Here, capturing times $T_1$ and $T_2$ each indicate a point of time at which the exposure has started in the example of FIG. 2, that is, the rising time of the rectangular signal. Thus, the exposure end time of camera 100-1 is $T_1+T_{E1}$. At this time, if Expression (1) or Expression (2) is satisfied, it means that the two cameras are capturing the subject at the same point of time, and the two frames are thus said to be synchronous frames.

[MATHEMATICAL FORMULA1]

$$T_1 \leq T_2 \leq T_1+T_{E1} \qquad \text{Expression (1)}$$

[MATHEMATICAL FORMULA2]

$$T_1 \leq T_2+T_{E2} \leq T_1+T_{E1} \qquad \text{Expression (2)}$$

Figure 5:
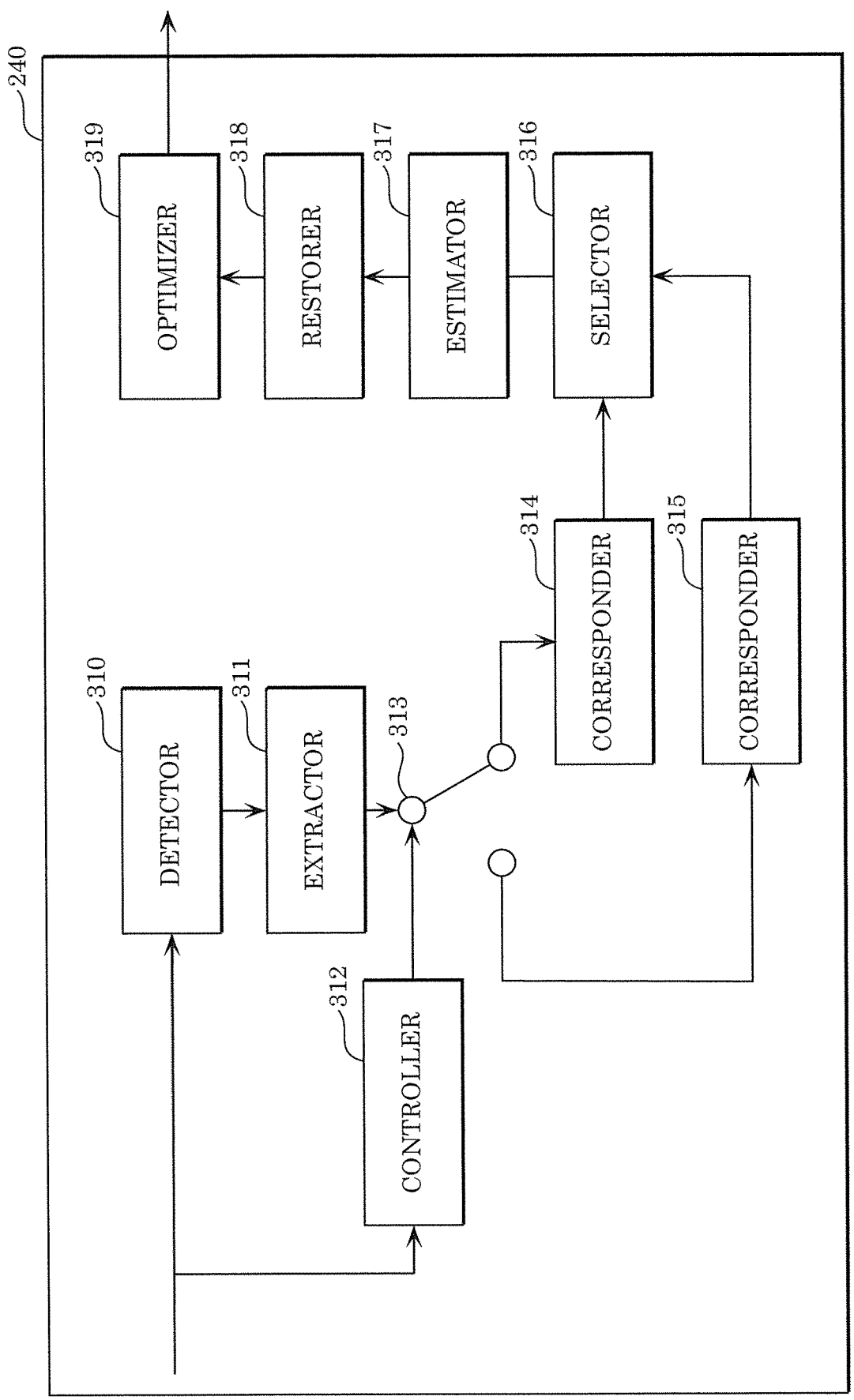
FIG. 5 illustrates a configuration of the three-dimensional reconstructor according to Embodiment 1.

FIG. 5 is a block diagram illustrating a configuration of three-dimensional reconstructor 240 according to the present disclosure.

Three-dimensional reconstructor 240 estimates a camera parameter and reconstructs a three-dimensional model using a multi-view frame set input from obtainer 230 of three-dimensional reconstruction device 200 illustrated in FIG. 1. As illustrated in FIG. 5, three-dimensional reconstructor 240 includes detector 310, extractor 311, controller 312, switch 313, corresponder 314, corresponder 315, selector 316, estimator 317, restorer 318, and optimizer 319.

Detector 310 detects a keypoint in each frame of the multi-view frame set received. A keypoint is: a point or an edge, such as an outline of an object included in a frame, a corner of an object or space, or an intersection of objects in a frame plane; or a point, a side, or a certain region having a large difference in luminance or hue between a certain region and its surroundings.

Extractor 311 extracts feature vectors of the keypoints detected by detector 310. A feature vector represents, by means of a vector, the distribution of the gradient directions of the luminance or hue of pixels included in a specific region having a keypoint. Note that a keypoint and a feature vector may be other image information detected using, for example, texture information or information after frequency conversion.

Controller 312 selects two frames from a multi-view frame set as a frame pair. Further, controller 312 determines, using image information of each of the two frames, whether or not the two frames have the same image information. When the two frames have the same image information, switch 313 is connected to corresponder 314, whereas when the two frames do not have the same image information, switch 313 is connected to corresponder 315, and the frame pair, the keypoints, and the feature vectors are input to corresponder 314 or corresponder 315.

Here, the image information may be the capturing time or the frame number of a frame added to the header information of each multi-view frame set or each frame, or may be an amount of change in the temporal direction. An amount of change in the temporal direction may be the average value or the median value of amounts of change in the temporal direction of a plurality of small regions into which a frame is divided. Hereinafter, the image information will be described as the capturing time of a frame.

Corresponder 314 calculates, as corresponding points, corresponding keypoints in the entire regions of the two frames, using the feature vectors.

Corresponder 315 divides each of the two frames into image regions each having one or more features, and calculates, as corresponding points, corresponding keypoints in the image regions whose features are similar between the frames, using the feature vectors.

Note that the corresponding points are calculated by calculating a difference in feature vector between one keypoint in one frame of the frame pair and all the keypoints in the other frame of the frame pair, for example. A keypoint pair having the smallest difference in feature vectors is selected as a candidate for the corresponding points, and when the difference in feature vector is smaller than a given threshold value, the keypoint pair is determined as the corresponding points. The difference in feature vector is obtained by calculating the square error or absolute error of the two vectors.

Note that the image regions are obtained by, for example, dividing a frame into small regions, calculating a feature for each of the small regions, and integrating small regions having the same or similar features. The small regions may overlap with each other, may be adjacent to each other, or may be spaced apart from each other.

Selector 316 selects a target frame or a target frame pair to be three-dimensionally reconstructed, from among frames that are not reconstructed yet.

Estimator 317 estimates a camera parameter of a camera that has captured the target frame or estimates camera parameters of cameras that have captured the frames of the target frame pair, using the frame or the frame pair selected by selector 316 and the corresponding points of a reconstructed three-dimensional model.

Restorer 318 reconstructs a three-dimensional model of the subject by back-projecting the keypoint in each frame captured by one or more cameras whose camera parameters have been estimated, onto the three-dimensional coordinates, using the camera parameter(s) estimated by estimator 317.

Figure 6:
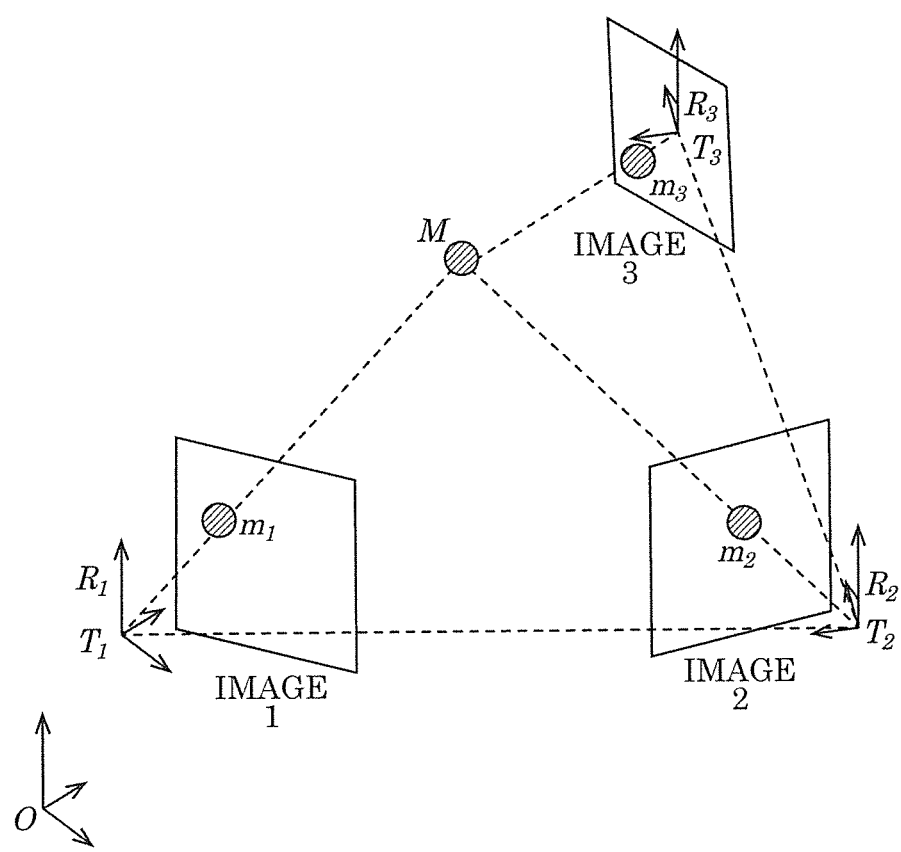
FIG. 6 illustrates an example of three-dimensional reconstruction using three multi-view frames according to Embodiment 1.

As an example of a camera parameter estimation method and a three-dimensional model reconstruction method using corresponding points, coordinates and orientations of cameras in a world coordinate system are calculated under constraints etc. of the epipolar geometry, and further, three-dimensional positions of points in images captured by the cameras are calculated in the world coordinate system. FIG. 6 illustrates an example in which external parameters of cameras are estimated and a three-dimensional model of the subject is reconstructed using three multi-view frames, given that the internal parameters of the camera are known.

In order to obtain a camera parameter of each camera, rotation matrices $R_1$, $R_2$, and $R_3$ and translation vectors $T_1$, $T_2$, and $T_3$ between the cameras in the world coordinates system having O as the origin need to be calculated. First, a method for calculating the rotation matrix and the translation vector of cameras that have captured images 1 and 2 will be described. When the point $m_1=(u_1, v_1, 1)$ in image 1 and the point $m_2=(u_2, v_2, 1)$ in image 2 correspond to each other, an epipolar equation satisfying Expression (3) holds for the points $m_1$ and $m_2$.

[MATHEMATICAL FORMULA3]

$$m_1^T F\ m_2 = 0 \qquad \text{Expression (3)}$$

Here, F will be referred to as a "fundamental matrix (F matrix)". Using an internal parameter K of each camera, the points $m_1$ and $m_2$ can be obtained as the points $$\tilde{m}_1 = (x_1, y_1, z_1)$$

and $$\tilde{m}_2 = (x_2, y_2, z_2)$$

in each camera coordinate system, on the basis of Expression (4). As a result, the epipolar equation can be converted into Expression (5).

[MATHEMATICAL FORMULA4]

$$\tilde{m} = K\ m \qquad \text{Expression (4)}$$

[MATHEMATICAL FORMULA5]

$$\tilde{m}_1^T E\ \tilde{m}_2 = 0 \qquad \text{Expression (5)}$$

Here, E will be referred to as an "essential matrix (E matrix)". Each element of the E matrix can be calculated using a plurality of corresponding points. After calculating each element of the F matrix using a plurality of corresponding points, namely, for example, the points $m_1$ and $m_2$ in the images, the E matrix may be obtained using Expression (6).

[MATHEMATICAL FORMULA6]

$$E = K^{-1} F\ K \qquad \text{Expression (6)}$$

By decomposing the E matrix, a rotation matrix and a translation vector from image 1 to image 2 in the world coordinate system can be obtained.

If a position of camera 1 in the world coordinate system and inclinations of camera 1 relative to the axes of the world coordinate system are known, positions and orientations of cameras 1 and 2 in the world coordinate system can be obtained using the above relationship. The position and orientation of camera 1 in the world coordinate system may be calculated based on camera sensor information other than a video, or may be measured in advance. Alternatively, the camera coordinate system of camera 1 may be determined as a world coordinate system, and positions and orientations of the other cameras may be calculated.

The three-dimensional point M in the world coordinate system can be obtained from the corresponding points used here, on the basis of a triangle obtained using the rotation matrix and the translation vector between images 1 and 2.

Further, the above geometrical relationship is expanded to three viewpoints. In an example in which image 3 is added to images 1 and 2, more specifically, E matrices are calculated between images 2 and 3 and between images 1 and 3, and relative rotation matrices and translation vectors are obtained for these cameras. By integrating these pieces of information together, the rotation matrix and translation vector of the camera which has captured image 3 in the world coordinate system can be calculated. Alternatively, the rotation matrix and translation vector of image 3 may be calculated in relation to image 1 and to image 2 on the basis of corresponding points. More specifically, corresponding points are obtained between images 1 and 3 and between images 2 and 3. If a point $m_3$ in image 3 corresponding to the point $m_1$ in image 1 and the point $m_2$ in image 2 is obtained, a relationship between the point $m_3$ in image 3 and coordinates in the three-dimensional space can be obtained since the three-dimensional coordinates of the corresponding point M are known. At this time, the following Expression (7) holds true.

[MATHEMATICAL FORMULA7]

$$\tilde{m} = P\, M \qquad \text{Expression (7)}$$

Here, P will be referred to as a "perspective matrix (P matrix)". Because the P matrix, the E matrix, and the internal matrix satisfy the following Expression (8), the E matrix of image 3 can be obtained. The rotation matrix and the translation vector can thus be obtained.

[MATHEMATICAL FORMULA8]

$$P = KE \qquad \text{Expression (8)}$$

Note that even if the internal parameter is unknown, the internal matrix and the E matrix can be determined by calculating the F matrix or the P matrix and then dividing the F matrix or the P matrix under the restriction that the internal matrix is an upper triangular matrix and the E matrix is a positive definite symmetric matrix.

Optimizer 319 corrects the camera parameter and the three-dimensional model of the subject.

The camera parameter(s) estimated by estimator 317 and the three-dimensional model of the subject reconstructed by restorer 318 include an error due to the accuracy of the keypoint detection or the accuracy of the corresponding point calculation. An example of the optimization processing of optimizer 319 is that a three-dimensional point of the reconstructed three-dimensional model of the subject is re-projected onto the frame of each camera, and the camera parameter(s) and the three-dimensional point of the subject are finely adjusted so as to minimize the sum of absolute differences or the sum of square differences from the original two-dimensional point position.

Figure 7:
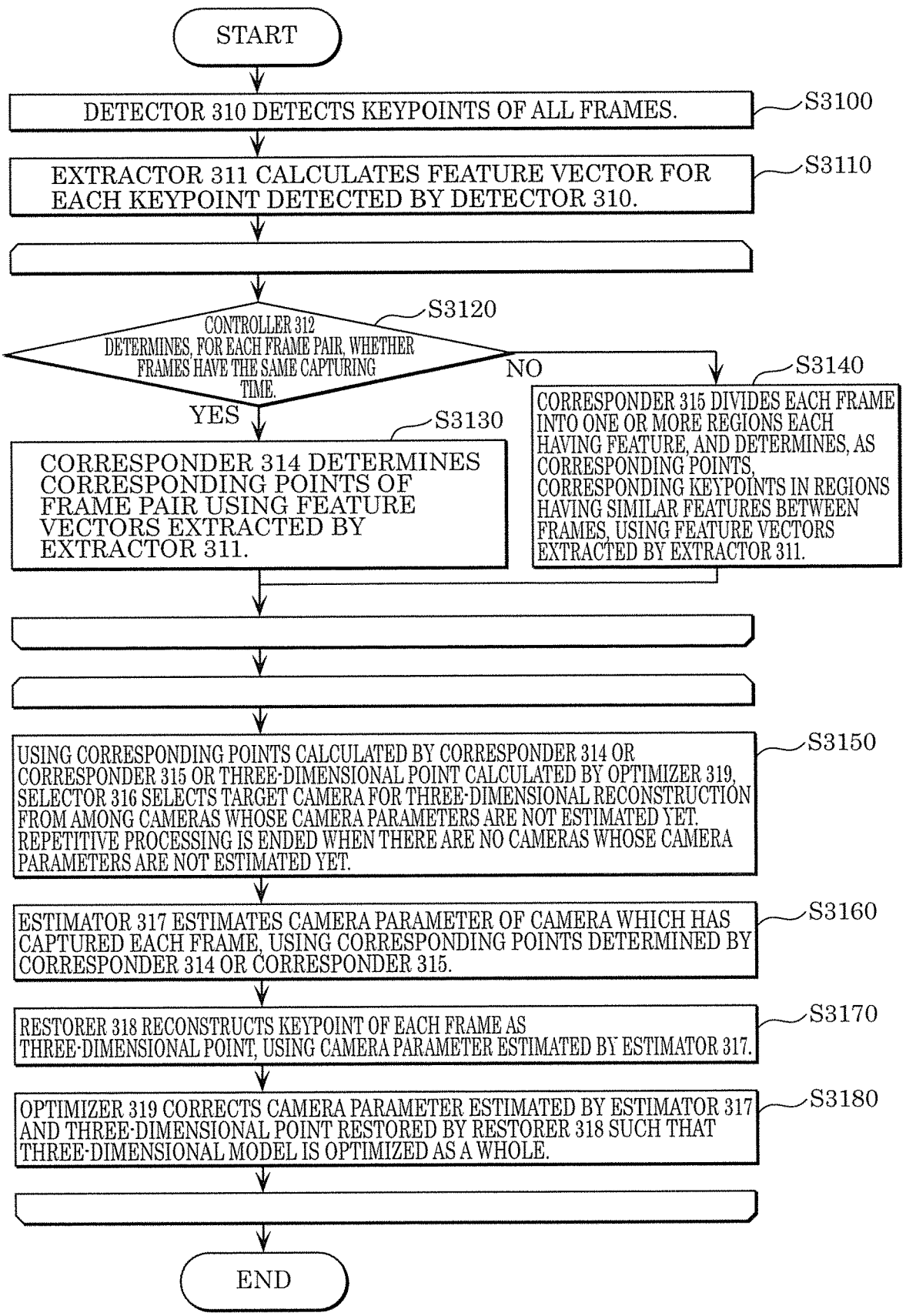
FIG. 7 illustrates a processing flow of the three-dimensional reconstructor according to Embodiment 1.

FIG. 7 illustrates a processing flow of three-dimensional reconstructor 240.

First, detector 310 detects keypoints from all the frames included in a frame set (S3100).

Next, extractor 311 calculates a feature vector for each keypoint detected by detector 310, using the keypoint and peripheral pixels (S3110).

Next, controller 312 selects two frames from the frame set as a frame pair, and determines whether the two frames have the same capturing time, using the capturing time information or the frame number information added to the header information of the frame set or each frame (S3120). Controller 312 connects switch 313 to corresponder 314 when the two frames have the same capturing time, and connects switch 313 to corresponder 315 when the two frames do not have the same capturing time, to sequentially input the frame pair, the keypoints, and the feature vectors to corresponder 314 or corresponder 315 (S3120).

Note that the capturing times do not need to be exactly the same, and it may be determined that two frames have the same capturing time when the time difference between the capturing times of the two frames is smaller than a predetermined threshold value.

In the case of YES in S3120, corresponder 314 calculates, as corresponding points, corresponding keypoints in the frames of the frame pair, using the feature vectors extracted by extractor 311 (S3130).

In the case of NO in S3120, corresponder 315 divides each frame of the frame pair into one or more image regions each having a feature, and corresponder 315 calculates, as corresponding points, corresponding keypoints in the image regions having similar features between the frames of the frame pair, using the feature vectors extracted by extractor 311 (S3140).

Note that S3120 to S3140 are repeatedly performed for all or a portion of frame pairs included in the frame set.

Next, using the corresponding points calculated by corresponder 314 or corresponder 315 and three-dimensional points calculated by optimizer 319, selector 316 selects a target camera or a target camera pair for the three-dimensional reconstruction from among the cameras that have captured the frames that are not reconstructed yet (S3150).

Next, estimator 317 estimates a camera parameter of the target camera or the target camera pair selected by selector 316, using the corresponding points calculated by corresponder 314 or corresponder 315 and the three-dimensional point calculated by optimizer 319 (S3160).

Next, using the camera parameter estimated by estimator 317, restorer 318 reconstructs a keypoint in a frame captured by the target camera as a three-dimensional point and calculates three-dimensional coordinates of the keypoint (S3170).

Next, optimizer 319 corrects the camera parameter estimated by estimator 317 and the three-dimensional point calculated by restorer 318 such that the reconstructed three-dimensional model is optimized as a whole (S3180).

One example of the optimization of the three-dimensional model is to minimize an error between an original two-dimensional point position of a keypoint and a two-dimensional point position obtained by re-projecting, onto each frame, a three-dimensional point reconstructed using the camera parameter.

Note that S3150 to S3180 are repeatedly performed until all or a portion of the frames in the frame set are reconstructed.

This makes it possible to reconstruct time-series three-dimensional models having the same coordinate axes at each time point, regardless of the motion of the cameras or the subject.

Note that S3120 to S3140 may be performed immediately after S3150. At this time, the corresponding points in the frame pair are determined for a camera pair or a camera selected by selector 316. When a camera pair is selected by selector 316, processing is performed for determining corresponding points in the frames captured by each camera of the camera pair. That is to say, the processing of S3120 to S3140 in FIG. 7 is performed once. When a camera is selected by selector 316, processing is performed for forming corresponding points between a target frame captured by the selected camera and all the frames other than the target frame. That is to say, when the number of input frames is N, processing of S3120 to S3140 in FIG. 7 is performed N-1 times. Note that the number of times the processing is performed is not limited to N-1; it may be performed on the frames of the estimated camera when S3150 is performed, or at least one frame may be arbitrarily selected from among the frames other than the target frame.

Here, an example of an internal configuration of corresponder 315 will be described in detail.

Figure 8:
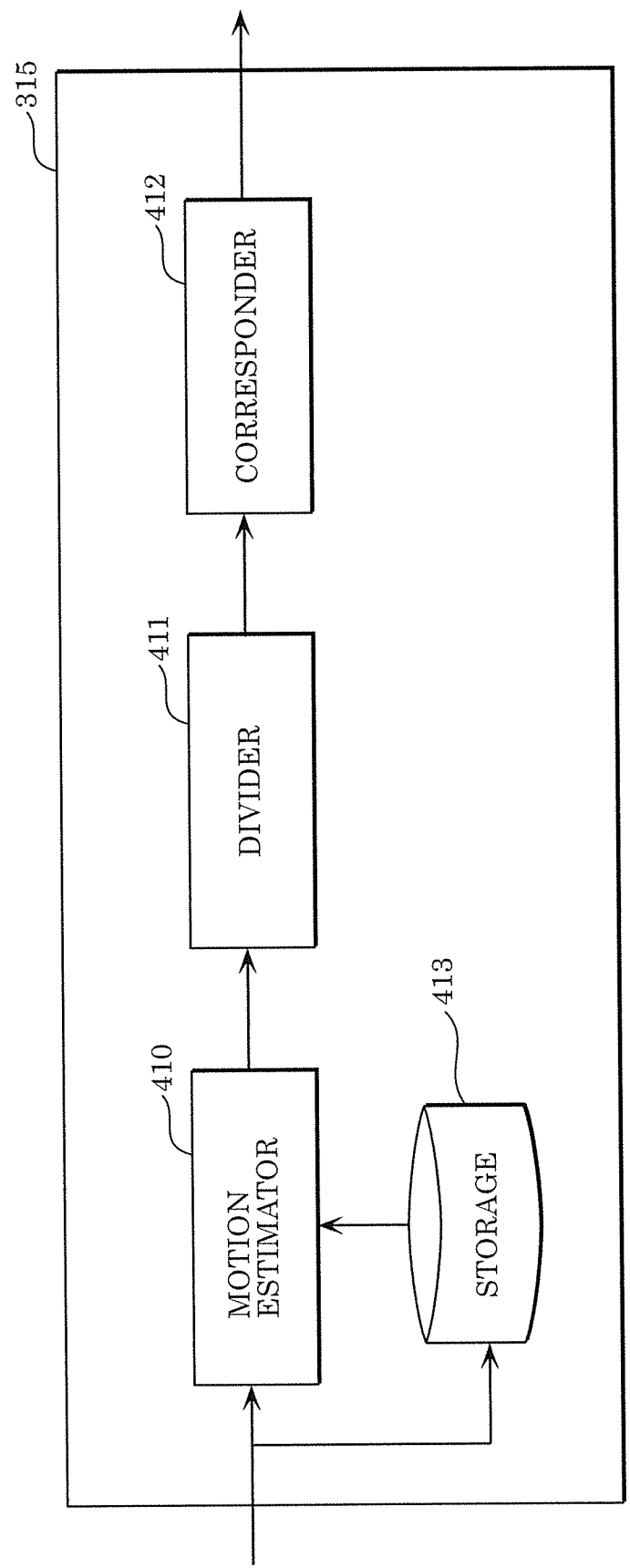
FIG. 8 illustrates an example of a configuration of corresponder 315 according to Embodiment 1.

FIG. 8 illustrates an example of an internal configuration of corresponder 315 according to the present embodiment.

Corresponder 315 includes motion estimator 410, divider 411, corresponder 412, and storage 413.

With each frame of the frame pair as a target frame, motion estimator 410 performs the following: obtains a preceding frame that temporally precedes the target frame or a following frame that temporally follows the target frame, or both the preceding frame and the following frame, stored in storage 413; divides the target frame into a plurality of small regions; and estimates, for each small region, a motion vector as the feature of the small region. Here, the preceding frame and the following frame are frames captured by a camera that has captured the target frame.

Using the motion vectors of the plurality of small regions estimated by motion estimator 410, divider 411 integrates small regions whose motion vectors are the same or similar. As a result, the frame is divided into a moving region and a still region.

Using the feature vectors extracted by extractor 311, corresponder 412 calculates, as corresponding points, corresponding keypoints in the still regions of the frames of the frame pair among the image regions divided into by divider 411. Further, the target frame is stored in storage 413.

Figure 9:
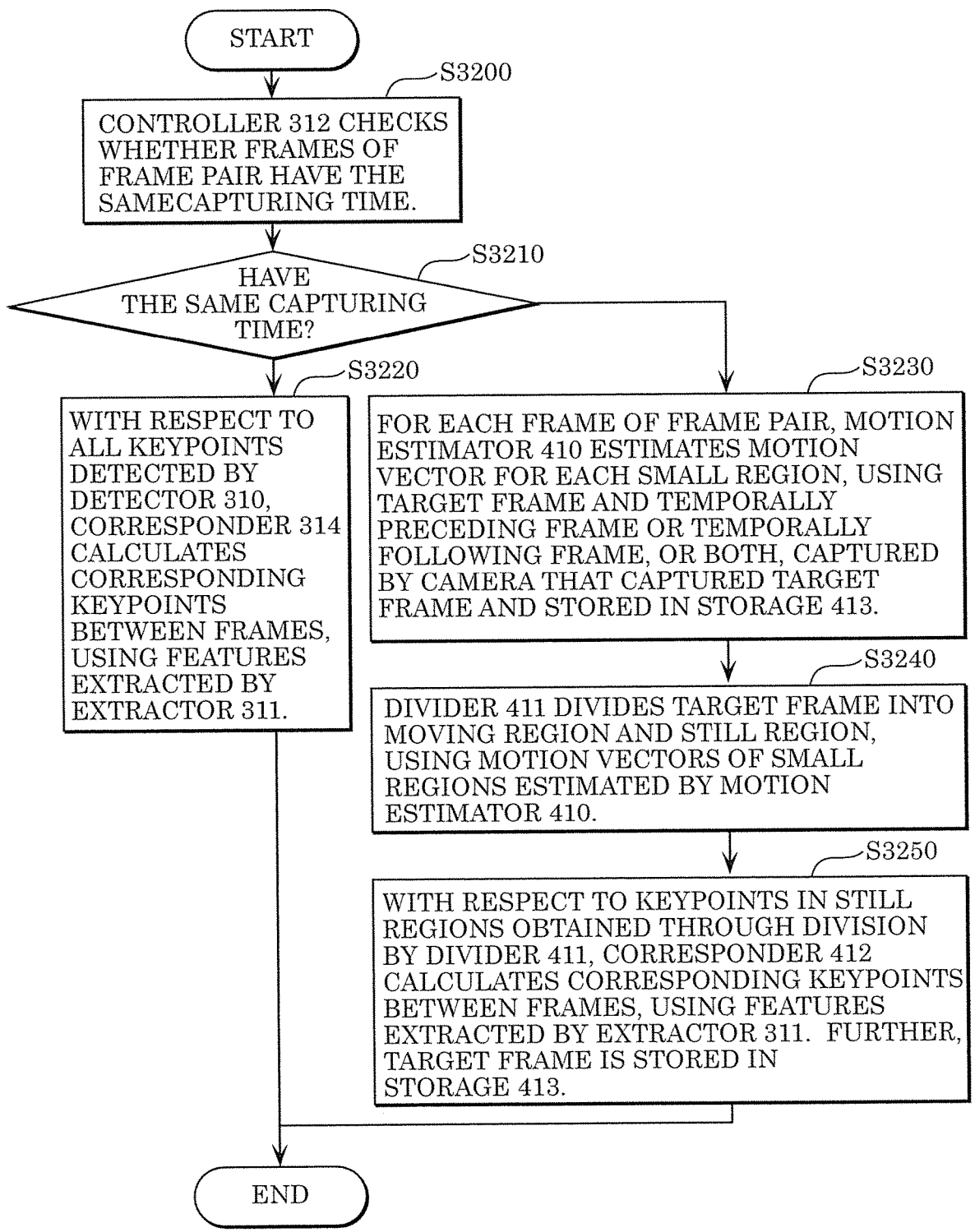
FIG. 9 illustrates a processing flow for calculating corresponding keypoints according to Embodiment 1.

FIG. 9 illustrates a processing flow of corresponder 315 according to the present embodiment.

First, controller 312 checks whether the frames of the frame pair have the same capturing time (S3200).

Next, when the frames have the same capturing time in S3200, switch 313 is connected to corresponder 314, whereas when the frames do not have the same capturing time, switch 313 is connected to corresponder 315 (S3210).

(When the Frames Have the Same Capturing Time in S3210)

Next, with respect to all the keypoints detected by detector 310, corresponder 314 determines corresponding points between the frames, using the feature vectors extracted by extractor 311 (S3220).

(When the Frames Do Not Have the Same Capturing Time in S3210)

Next, for each frame of the frame pair, motion estimator 410 estimates motion vectors of small regions, using the target frame and a preceding frame that temporally precedes the target frame and has been captured by a camera that has captured the target frame or a following frame that temporally follows the target frame and has been captured by the camera that has captured the target frame, or both the preceding frame and the following frame, stored in storage 413 (S3230).

For example, the target frame may be divided into small regions each having 15×15 pixels, and a motion vector of the central pixel in the temporal direction may be calculated.

Note that when the frame(s) extracted from storage 413 is(are) not to be used in subsequent processing, the frame(s) may be deleted here.

Next, divider 411 divides the target frame into a moving region and a still region by integrating small regions having the same or similar motion vectors, using the motion vectors that are features of the small regions estimated by motion estimator 410 (S3240).

Specifically, the magnitude of each motion vector calculated in S3230 is compared with a threshold value, and when the magnitude of the motion vector is greater than or equal to the threshold value, the small region for which the motion vector has been calculated is classified as a moving region, and when the magnitude of the motion vector is smaller than the threshold value, the small region is classified as a still region.

The motion vector calculated here as $$\vec{V}$$

is, for example, a two-dimensional vector $(X_1, Y_1)$ composed of an X component and a Y component, and the magnitude of the motion vector $$|\vec{V}|$$

can be calculated on the basis of Expression (9).

[MATHEMATICAL FORMULA9]

$$|\vec{V}|=\sqrt{X_1^2+Y_1^2} \qquad \text{Expression (9)}$$

Note that in consideration of the motion of the camera, a global vector $$\vec{V}_g=(X_{g1},Y_{g1})$$

that represents the motion of the entire frame caused by the motion of the camera may be calculated. Then, the motion of each small region may be estimated using the motion vector $$\vec{V}'=(X'_1,Y'_1)$$

that is corrected using the global vector as shown in Expression (10) and Expression (11).

[MATHEMATICAL FORMULA10]

$$X'_1=X_1-X_{g1} \qquad \text{Expression (10)}$$

[MATHEMATICAL FORMULA11]

$$Y'_1=Y_1-Y_{g1} \qquad \text{Expression (11)}$$

Next, with respect to the keypoints in the still regions obtained through the division by divider 411, corresponder 412 determines corresponding points between the frames, using the feature vectors extracted by extractor 311. Further, the target frame is stored in storage 413 (S3250).

Note that the plurality of small regions on which motion estimation is performed may be set to overlap with each other, or may be set to be adjacent to each other, or may be set to be spaced apart from each other.

Note that the center of each small region on which motion estimation is performed may be deemed as a keypoint. At this time, the number of small regions and the number of keypoints are the same. Further, at this time, it is unnecessary to divide the region of the frame; the keypoints may be classified into moving points and still points using the motion vectors of the keypoints.

Note that the result of the division by divider 411 may be used for the connection of switch 313 performed by controller 312. Specifically, a frame is divided into one or more regions using the motion vectors of the small regions estimated by estimator 410. When both frames of the frame pair have one region and the features of the regions are the same or similar, switch 313 is connected to corresponder 314, otherwise, switch 313 is connected to corresponder 315. At this time, corresponder 315 calculates corresponding keypoints using the keypoints in the regions having the same or similar features.

As described above, by using the keypoints in all the image regions for frames having the same capturing time and using the keypoints in the still regions for frames having different capturing times, it is possible, when performing three-dimensional reconstruction using corresponding points in moving regions for frames having different capturing times, to reduce difficulty in precise camera parameter estimation and three-dimensional point reconstruction because the three-dimensional positions of corresponding two points are different, and it is possible to reconstruct time-series three-dimensional models having the same coordinate axes, regardless of the motion of the cameras or the subject.

Note that although an image capturing method etc. according to one or more aspects of the present disclosure have been described based on each embodiment and variation above, the present disclosure is not limited to each embodiment or variation above. One or more aspects of the present disclosure include the following examples as well.

(1) Each of the above-described devices is, specifically, a computer system including a microprocessor, a ROM, a RAM, a hard disk unit, a display unit, a keyboard, and a mouse, for example. A computer program is stored in the RAM or the hard disk unit. Each of the devices achieves its function as a result of the microprocessor operating according to the computer program. Here, the computer program is configured by combining a plurality of instruction codes indicating instructions for the computer in order to achieve a given function.

(2) A portion or all of the structural elements of each of the above-described devices may be configured from one system large-scale integration (LSI). A system LSI is a super-multifunction LSI manufactured with a plurality of components integrated on a single chip, and specifically is a computer system including a microprocessor, ROM, and RAM, for example. A computer program is stored in the RAM. The system LSI achieves its function as a result of the microprocessor operating according to the computer program.

(3) A portion or all of the structural elements of each of the above-described devices may be configured from an IC card detachable from the device or a stand-alone module. The IC card and the module are computer systems configured from a microprocessor, a ROM, and a RAM, for example. The IC card and the module may include the super-multifunction LSI described above. The IC card and the module achieve their function as a result of the microprocessor operating according to a computer program. The IC card and the module may be tamperproof.

(4) The present disclosure may be realized as the methods described above. In addition, the present disclosure may also be realized as a computer program realizing such methods with a computer, or as a digital signal of the computer program.

Moreover, the present disclosure may also be realized as the computer program or the digital signal recorded on computer-readable recording media, such as a flexible disk, hard disk, CD-ROM, MO, DVD, DVD-ROM, DVD-RAM, Blu-ray (registered trademark) Disc (BD), or a semiconductor memory. The present disclosure may also be realized as a digital signal recorded on the above-mentioned recording media.

Moreover, the present disclosure may also be realized by transmitting the computer program or the digital signal via, for example, an electric communication line, a wireless or wired line, a network such as the Internet, or data broadcasting.

Moreover, the present disclosure may be a computer system including memory storing a computer program and a microprocessor operating according to the computer program.

Moreover, the program or the digital signal may be implemented by another independent computer system by being stored on the recording media and transmitted, or by being transmitted via the network, for example.

(5) The above embodiment and variation may be combined.

Although some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful in a three-dimensional reconstruction device or a three-dimensional reconstruction method.

What is claimed is:

1. A three-dimensional reconstruction method of reconstructing a three-dimensional model from multi-view images, the method comprising:
    selecting two frames from the multi-view images, the two frames consisting of a first frame and a second frame;
    calculating image information of each of the two frames;
    selecting a method of calculating corresponding keypoints in the two frames, according to the image information, from among a plurality of methods of calculating corresponding keypoints in two frames;
    calculating the corresponding keypoints using the method of calculating corresponding keypoints selected in the selecting of the method of calculating corresponding keypoints; and
    generating the three-dimensional model based on the calculated corresponding keypoints, wherein
    the image information of the first frame indicates a first capturing time at which the first frame has been captured and the image information of the second frame indicates a second capturing time at which the second frame has been captured, and
    the method of calculating corresponding keypoints differs depending on whether the first capturing time is same as the second capturing time.

2. The three-dimensional reconstruction method according to claim 1, wherein
    when the two frames have same image information, the corresponding keypoints in entire regions of the two frames are calculated, and
    when the two frames do not have the same image information, each of the two frames is divided into one or more regions each having a feature, and the corresponding keypoints in regions having similar features are calculated.

3. The three-dimensional reconstruction method according to claim 2, wherein
the two frames have the same image information when a difference in capturing time between the two frames is smaller than a predetermined threshold.

4. The three-dimensional reconstruction method according to claim 2, wherein
the feature of each of the one or more regions is a motion vector in a temporal direction of at least one small region included in the region.

5. The three-dimensional reconstruction method according to claim 2, wherein
when the two frames do not have the same image information, the calculating of the corresponding keypoints includes:
for each of the two frames, dividing the frame into small regions, and estimating motion vectors of the small regions using a preceding frame that temporally precedes the frame or a following frame that temporally follows the frame, or both the preceding frame and the following frame, the preceding frame and the following frame being frames captured by a camera that has captured the frame;
dividing each of the two frames into a moving region and a still region, using the motion vectors; and
calculating the corresponding keypoints in the still regions of the two frames.

6. The three-dimensional reconstruction method according to claim 2, wherein
when the two frames do not have the same image information, the calculating of the corresponding keypoints includes:
estimating motion vectors of keypoints in the two frames;
classifying the keypoints into moving points and still points using the motion vectors; and
calculating corresponding still points in the two frames as the corresponding keypoints.

7. A three-dimensional reconstructor that reconstructs a three-dimensional model from multi-view images, the three-dimensional reconstructor comprising:
a memory configured to store a program; and
a processor configured to execute the program and control the three-dimensional reconstructor to:
select two frames from the multi-view images, the two frames consisting of a first frame and a second frame;
calculate image information of each of the two frames;
select a method of calculating corresponding keypoints in the two frames, according to the image information, from among a plurality of methods of calculating corresponding keypoints in two frames;
calculate the corresponding keypoints using the method of calculating corresponding keypoints selected in the selecting of the method of calculating corresponding keypoints; and
generate the three-dimensional model based on the calculated corresponding keypoints, wherein
the image information of the first frame indicates a first capturing time at which the first frame has been captured and the image information of the second frame indicates a second capturing time at which the second frame has been captured, and
the method of calculating corresponding keypoints differs depending on whether the first capturing time is same as the second capturing time.

8. The three-dimensional reconstructor according to claim 7, wherein
when the two frames have same image information, the corresponding keypoints in entire regions of the two frames are calculated, and
when the two frames do not have the same image information, each of the two frames is divided into one or more regions each having a feature, and the corresponding keypoints in regions having similar features are calculated.

9. The three-dimensional reconstructor according to claim 8, wherein
the two frames have the same image information when a difference in capturing time between the two frames is smaller than a predetermined threshold.

10. The three-dimensional reconstructor according to claim 8, wherein
the feature of each of the one or more regions is a motion vector in a temporal direction of at least one small region included in the region.

11. The three-dimensional reconstructor according to claim 8, wherein
when the two frames do not have the same image information, the calculating of the corresponding keypoints includes:
for each of the two frames, dividing the frame into small regions, and estimating motion vectors of the small regions using a preceding frame that temporally precedes the frame or a following frame that temporally follows the frame, or both the preceding frame and the following frame, the preceding frame and the following frame being frames captured by a camera that has captured the frame;
dividing each of the two frames into a moving region and a still region, using the motion vectors; and
calculating the corresponding keypoints in the still regions of the two frames.

12. The three-dimensional reconstructor according to claim 8, wherein
when the two frames do not have the same image information, the calculating of the corresponding keypoints includes:
estimating motion vectors of keypoints in the two frames;
classifying the keypoints into moving points and still points using the motion vectors; and
calculating corresponding still points in the two frames as the corresponding keypoints.

* * * * *